US 12,161,986 B2

United States Patent
Tanaka et al.

(10) Patent No.: US 12,161,986 B2
(45) Date of Patent: Dec. 10, 2024

(54) FINE PARTICLE MANUFACTURING APPARATUS AND FINE PARTICLE MANUFACTURING METHOD

(71) Applicants: NATIONAL UNIVERSITY CORPORATION KANAZAWA UNIVERSITY, Kanazawa (JP); NISSHIN SEIFUN GROUP INC., Tokyo (JP)

(72) Inventors: Yasunori Tanaka, Kanazawa (JP); Kotaro Shimizu, Kanazawa (JP); Shiori Sueyasu, Fujimino (JP); Shu Watanabe, Fujimino (JP); Tomoya Watanabe, Fujimino (JP); Keitaro Nakamura, Fujimino (JP)

(73) Assignees: NATIONAL UNIVERSITY CORPORATION KANAZAWA UNIVERSITY, Ishikawa (JP); NISSHIN SEIFUN GROUP INC., Tokyo (JP)

( * ) Notice: Subject to any disclaimer, the term of this patent is extended or adjusted under 35 U.S.C. 154(b) by 938 days.

(21) Appl. No.: 17/272,882

(22) PCT Filed: Sep. 2, 2019

(86) PCT No.: PCT/JP2019/034379
§ 371 (c)(1),
(2) Date: Mar. 2, 2021

(87) PCT Pub. No.: WO2020/050202
PCT Pub. Date: Mar. 12, 2020

(65) Prior Publication Data
US 2021/0316268 A1 Oct. 14, 2021

(30) Foreign Application Priority Data
Sep. 3, 2018 (JP) .................................. 2018-164750

(51) Int. Cl.
*B01J 19/08* (2006.01)
*B01J 2/04* (2006.01)
(Continued)

(52) U.S. Cl.
CPC .................. *B01J 19/08* (2013.01); *B01J 2/04* (2013.01); *B22F 9/14* (2013.01); *C01B 33/027* (2013.01);
(Continued)

(58) Field of Classification Search
CPC . H05H 1/30; C01B 33/027; B22F 9/14; B01J 2/04; B01J 19/08
See application file for complete search history.

(56) References Cited

U.S. PATENT DOCUMENTS

2015/0175429 A1 6/2015 Watanabe et al.
2017/0173699 A1 6/2017 Hadidi et al.

FOREIGN PATENT DOCUMENTS

JP    2010131577      *  6/2010
JP    2017105680          6/2017
WO    WO2014002695 A1    1/2014

* cited by examiner

*Primary Examiner* — Stella K Yi
(74) *Attorney, Agent, or Firm* — MUNCY, GEISSLER, OLDS & LOWE, P.C.

(57) ABSTRACT

Provided are a fine particle manufacturing apparatus and a fine particle manufacturing method, which manufacture smaller fine particles. The fine particle manufacturing apparatus has: a raw material supply unit that supplies raw materials for producing fine particles into a thermal plasma flame; a plasma torch in which the thermal plasma flame is generated and the raw materials supplied by the raw material supply unit is evaporated by the thermal plasma flame to form a mixture in a gaseous state; a plasma generation unit that generates the thermal plasma flame inside the plasma torch; and a gas supply unit that supplies quenched gas to the
(Continued)

thermal plasma flame, wherein the gas supply unit supplies the quenched gas with time modulation of the supply amount of the quenched gas.

20 Claims, 11 Drawing Sheets

(51) Int. Cl.
  *B22F 9/14* (2006.01)
  *C01B 33/027* (2006.01)
  *H05H 1/30* (2006.01)
(52) U.S. Cl.
  CPC ........ *H05H 1/30* (2013.01); *B01J 2219/0869* (2013.01); *B01J 2219/0875* (2013.01); *B01J 2219/089* (2013.01); *B01J 2219/0898* (2013.01)

FINE PARTICLE MANUFACTURING APPARATUS AND FINE PARTICLE MANUFACTURING METHOD

TECHNICAL FIELD

The present invention relates to a fine particle manufacturing apparatus and a fine particle manufacturing method using a thermal plasma flame, particularly to a fine particle manufacturing apparatus and a fine particle manufacturing method for manufacturing fine particles, wherein quenching gas used to cool a thermal plasma flame is supplied while being time-modulated.

BACKGROUND ART

At present, fine particles such as silicon fine particles, oxide fine particles, nitride fine particles and carbide fine particles are used in a wide variety of fields. One example of the method of manufacturing such fine particles is a gas-phase process. Exemplary gas-phase processes include chemical processes in which various gases or the like are chemically reacted at high temperature and physical processes in which a substance is irradiated with a beam such as an electron beam or a laser beam so as to be decomposed and evaporated, thereby generating fine particles.

Another gas-phase process is a thermal plasma process. The thermal plasma process is a process for manufacturing fine particles by instantly evaporating feedstock in a thermal plasma flame and then rapidly cooling and solidifying the resulting evaporated product. The thermal plasma process has many advantages; for instance, the thermal plasma process is clean and highly productive, provides a high temperature and has a large heat capacity, and therefore is applicable to high melting point materials, so that the thermal plasma process enables relatively easy complexing as compared to other gas-phase processes. Accordingly, the thermal plasma process is actively utilized as a method of manufacturing fine particles.

In a fine particle manufacturing method using a conventional thermal plasma process, for instance, a feedstock substance is powdered, the powdered feedstock (powdery feedstock, powder) is, together with carrier gas and the like, dispersed and directly supplied into thermal plasma, whereby fine particles are manufactured.

For example, Patent Literature 1 describes a method of manufacturing titanium carbide nanoparticles.

Patent Literature 1 has a step of dispersing titanium powder or titanium oxide powder using carrier gas to supply the titanium powder or titanium oxide powder into a thermal plasma flame and a step of supplying cooling gas and reactive gas, which serves as a carbon source, to a terminating portion of the thermal plasma flame to manufacture titanium carbide nanoparticles, and describes that the oxygen concentration of the titanium carbide nanoparticles to be manufactured is varied by changing an amount of the reactive gas to be supplied.

Besides, Patent Literature 1 has a step of dispersing titanium powder or titanium oxide powder in a carbon-containing liquid substance which serves as a carbon source to obtain a slurry and a step of converting the slurry into droplets to supply the droplets into a thermal plasma flame by using carrier gas, and describes that the oxygen concentration of titanium carbide nanoparticles to be manufactured is varied by changing the flow rate of the carrier gas when the slurry is charged, while controlling the feed rate of the slurry to be constant.

CITATION LIST

Patent Literature

Patent Literature 1: WO 2014/002695

SUMMARY OF INVENTION

Technical Problems

As evident from Patent Literature 1 above, there has been conventionally known a fine particle manufacturing method including: dispersing titanium powder or titanium oxide powder using carrier gas to supply the titanium powder or titanium oxide powder into a thermal plasma flame; and slurrying titanium powder or titanium oxide powder and converting the obtained slurry into droplets to supply the droplets into a thermal plasma flame by using carrier gas.

The manufacturing method described in Patent Literature 1 is capable of manufacturing nanosized fine particles; however, there is currently a demand for fine particles with a size even smaller than that, and the above manufacturing method cannot sufficiently meet the demand.

An object of the present invention is to provide a fine particle manufacturing apparatus and a fine particle manufacturing method for manufacturing fine particles with a smaller size.

Solution to Problems

In order attain the above object, the present invention provides a fine particle manufacturing apparatus comprising: a feedstock supply section configured to supply feedstock for fine particle manufacturing into a thermal plasma flame; a plasma torch configured to allow the thermal plasma flame to be generated therein and, by use of the thermal plasma flame, evaporate the feedstock supplied by the feedstock supply section to convert the feedstock into a mixture in a gas phase state; a plasma generation section configured to generate the thermal plasma flame inside the plasma torch; and a gas supply section configured to supply quenching gas to the thermal plasma flame, wherein the gas supply section supplies the quenching gas while time-modulating an amount of supply of the quenching gas.

Preferably, the feedstock supply section supplies the feedstock into the thermal plasma flame while time-modulating an amount of supply of the feedstock into the thermal plasma flame.

Preferably, the plasma generation section generates, as the thermal plasma flame, a modulated induction thermal plasma flame whose temperature state is time-modulated, and periodically switches the modulated induction thermal plasma flame between a high temperature state and a low temperature state having a lower temperature than the high temperature state.

Preferably, the gas supply section increases the amount of supply of the quenching gas when the modulated induction thermal plasma flame is in the low temperature state.

Preferably, the feedstock supply section increases the amount of supply of the feedstock when the modulated induction thermal plasma flame is in the high temperature state.

Preferably, the feedstock supply section supplies the feedstock into the thermal plasma flame with the feedstock being dispersed in a particulate form.

Preferably, the feedstock supply section disperses the feedstock in liquid to obtain a slurry and converts the slurry into droplets to supply the droplets into the thermal plasma flame.

The present invention also provides a fine particle manufacturing method comprising: a first step of supplying feedstock for fine particle manufacturing to a thermal plasma flame; and a second step of evaporating the feedstock by use of the thermal plasma flame to convert the feedstock into a mixture in a gas phase state and supplying quenching gas to the thermal plasma flame, wherein in the second step, the quenching gas is supplied while an amount of supply of the quenching gas is time-modulated.

Preferably, in the first step, the feedstock is supplied into the thermal plasma flame while an amount of supply of the feedstock into the thermal plasma flame is time-modulated.

Preferably, the thermal plasma flame is a modulated induction thermal plasma flame whose temperature state is time-modulated to periodically switch between a high temperature state and a low temperature state having a lower temperature than the high temperature state.

Preferably, in the second step, the amount of supply of the quenching gas is increased when the modulated induction thermal plasma flame is in the low temperature state.

Preferably, in the first step, the amount of supply of the feedstock is increased when the modulated induction thermal plasma flame is in the high temperature state.

Preferably, in the first step, the feedstock is supplied into the thermal plasma flame with the feedstock being dispersed in a particulate form.

Preferably, in the first step, the feedstock is dispersed in liquid to obtain a slurry, the slurry is converted into droplets, and the droplets are supplied into the thermal plasma flame.

Advantageous Effects of Invention

The fine particle manufacturing apparatus and the fine particle manufacturing method according to the invention make it possible to manufacture fine particles with a smaller size.

DESCRIPTION OF EMBODIMENTS

A fine particle manufacturing apparatus and a fine particle manufacturing method according to the present invention are described below in detail based on a preferred embodiment shown in the accompanying drawings.

Figure 1:
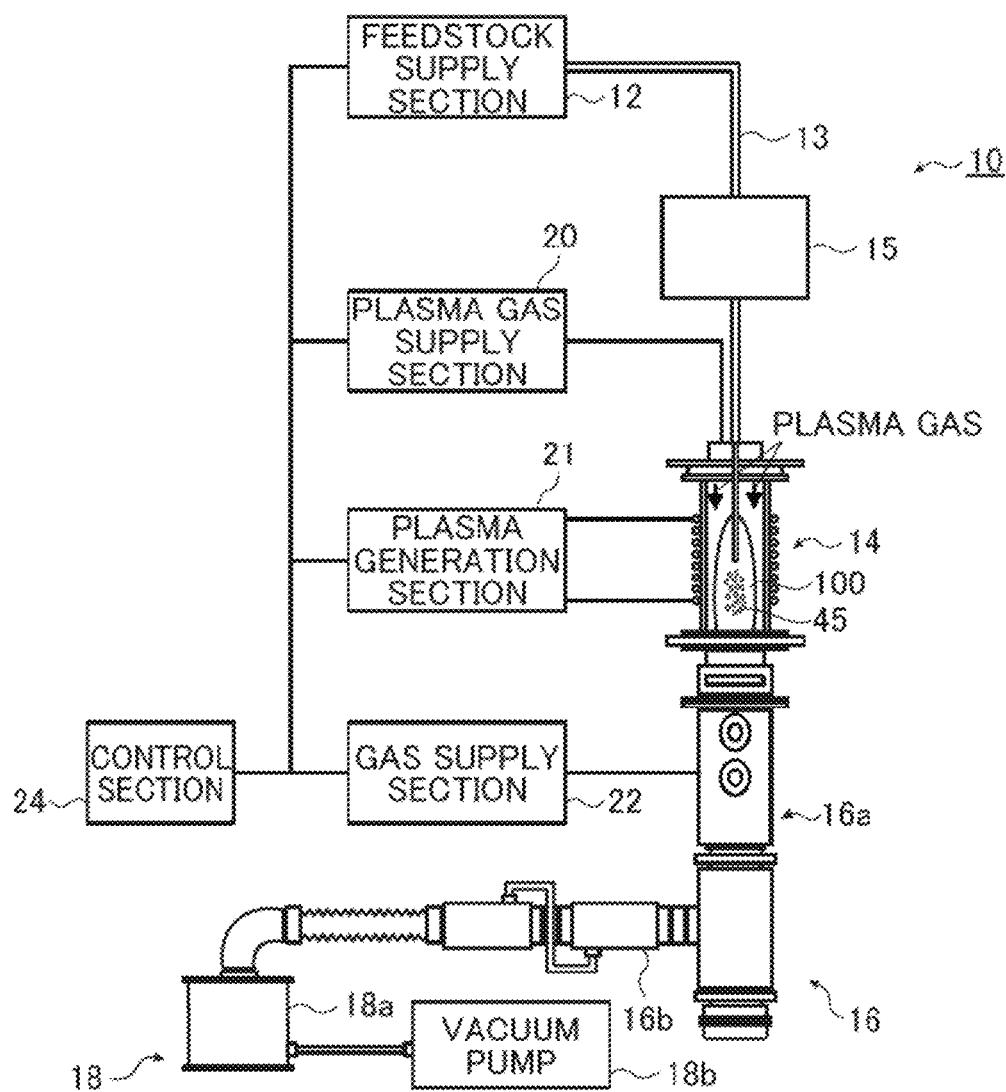
FIG. 1 is a schematic view showing an example of a fine particle manufacturing apparatus according to an embodiment of the invention.

FIG. 1 is a schematic view showing an example of a fine particle manufacturing apparatus according to an embodiment of the invention.

A fine particle manufacturing apparatus 10 (hereinafter referred to simply as "manufacturing apparatus 10") shown in FIG. 1 manufactures nanosized fine particles using feedstock for fine particle manufacturing. For instance, powder is used as the feedstock for fine particle manufacturing.

The manufacturing apparatus 10 can manufacture any fine particles whose type is not particularly limited, i.e., can manufacture such fine particles as, in addition to metal fine particles, oxide fine particles, nitride fine particles, carbide fine particles and oxynitride fine particles by changing the composition of the feedstock.

The manufacturing apparatus 10 includes a feedstock supply section 12, a plasma torch 14, a chamber 16, a collection section 18, a plasma gas supply section 20, a plasma generation section 21, a gas supply section 22, and a control section 24.

The feedstock supply section 12 is connected to the plasma torch 14 through a hollow supply tube 13.

The supply tube 13 between the feedstock supply section 12 and the plasma torch 14 may be provided with an intermittent supply section 15 as described later. The intermittent supply section 15 is not an essential element in the manufacturing apparatus 10, but it is more preferable to provide the intermittent supply section 15.

The chamber 16 is disposed below the plasma torch 14, and the collection section 18 is disposed at the chamber 16. The plasma generation section 21 is connected to the plasma torch 14, and a thermal plasma flame 100 is generated in the plasma torch 14 by means of the plasma generation section 21 as described later.

The feedstock supply section 12 is provided to supply feedstock for fine particle manufacturing into the thermal plasma flame 100 generated in the plasma torch 14.

The type of the feedstock supply section 12 is not particularly limited as long as it can supply the feedstock into the thermal plasma flame 100, and the following two types are applicable: one supplying the feedstock into the thermal plasma flame 100 with the feedstock being dispersed in a particulate form, and one slurrying the feedstock and converting the obtained slurry into droplets to supply the droplets into thermal plasma flame 100.

For example, in the case where powder is used as the feedstock for fine particle manufacturing, the feedstock needs to be dispersed in a particulate form when supplied into the thermal plasma flame 100 in the plasma torch 14. Therefore, the feedstock is for instance dispersed in carrier gas so that the feedstock in a particulate form is supplied. In this case, the feedstock supply section 12 supplies the feedstock powder in a fixed amount into the thermal plasma flame 100 in the plasma torch 14 whilst maintaining the feedstock powder to be in a dispersed state. For the feedstock supply section 12 having such a function, usable examples include devices disclosed in JP 3217415 B and JP 2007-138287 A.

For example, the feedstock supply section 12 includes a storage tank (not shown) storing feedstock powder, a screw feeder (not shown) transporting the feedstock powder in a fixed amount, a dispersion section (not shown) dispersing the feedstock powder transported by the screw feeder into a particulate form before the feedstock powder is finally sprayed, and a carrier gas supply source (not shown).

Together with carrier gas to which push-out pressure is applied from the carrier gas supply source, the feedstock powder is supplied into the thermal plasma flame 100 in the plasma torch 14 through the supply tube 13.

The configuration of the feedstock supply section 12 is not particularly limited as long as the feedstock supply section 12 can prevent the feedstock powder from agglomerating and spray the feedstock powder into the plasma torch 14 with the feedstock powder being dispersed in a particulate form and the dispersed state being maintained. Inert gases such as argon gas (Ar gas) and nitrogen gas are usable as the carrier gas, for example.

For the feedstock supply section 12 supplying the feedstock powder in the form of slurry, the device disclosed in JP 2011-213524 A may be used, for example. In this case, the feedstock supply section 12 includes a vessel (not shown) storing a slurry (not shown) having feedstock powder dispersed in liquid such as water, an agitator (not shown) agitating the slurry in the vessel, a pump (not shown) applying a high pressure to the slurry to supply the slurry into the plasma torch 14 through the supply tube 13, and an atomization gas supply source (not shown) supplying atomization gas used to convert the slurry into droplets and supply the droplets into the plasma torch 14. The atomization gas supply source corresponds to the carrier gas supply source. The atomization gas is also called carrier gas.

In the case where the feedstock is supplied in the form of slurry, the feedstock powder is dispersed in liquid such as water to obtain a slurry. The mixing ratio between the feedstock powder and water in the slurry is not particularly limited and is, for example, 5:5 (50%:50%) in the mass ratio.

In the case where used is the feedstock supply section 12 slurrying the feedstock powder and supplying the obtained slurry in the form of droplets, atomization gas to which push-out pressure is applied from the atomization gas supply source is, together with the slurry, supplied into the thermal plasma flame 100 in the plasma torch 14 through the supply tube 13. The supply tube 13 has a two-fluid nozzle mechanism for atomizing the slurry toward the thermal plasma flame 100 in the plasma torch and converting it into droplets, and using this mechanism, the slurry is atomized toward the thermal plasma flame 100 in the plasma torch 14. That is, the slurry can be converted into droplets. Similarly to the carrier gas described above, inert gases such as argon gas (Ar gas) and nitrogen gas are usable as the atomization gas, for example.

Thus, the two-fluid nozzle mechanism is capable of applying a high pressure to the slurry and atomizing the slurry with gas, i.e., the atomization gas (carrier gas), and is used as a method for converting the slurry into droplets.

It should be noted that the nozzle mechanism is not limited to the above-described two-fluid nozzle mechanism, and a single-fluid nozzle mechanism may also be used. For other methods, examples include a method which involves allowing a slurry to fall onto a rotating disk at a constant rate to convert the slurry into droplets (to form droplets) by the centrifugal force and a method which involves applying a high voltage to the surface of a slurry to convert the slurry into droplets (to generate droplets).

The plasma torch 14 is configured to allow the thermal plasma flame 100 to be generated therein and, by use of the thermal plasma flame 100, evaporate the feedstock supplied by the feedstock supply section 12 to convert the feedstock into a mixture 45 in a gas phase state.

Figure 2:
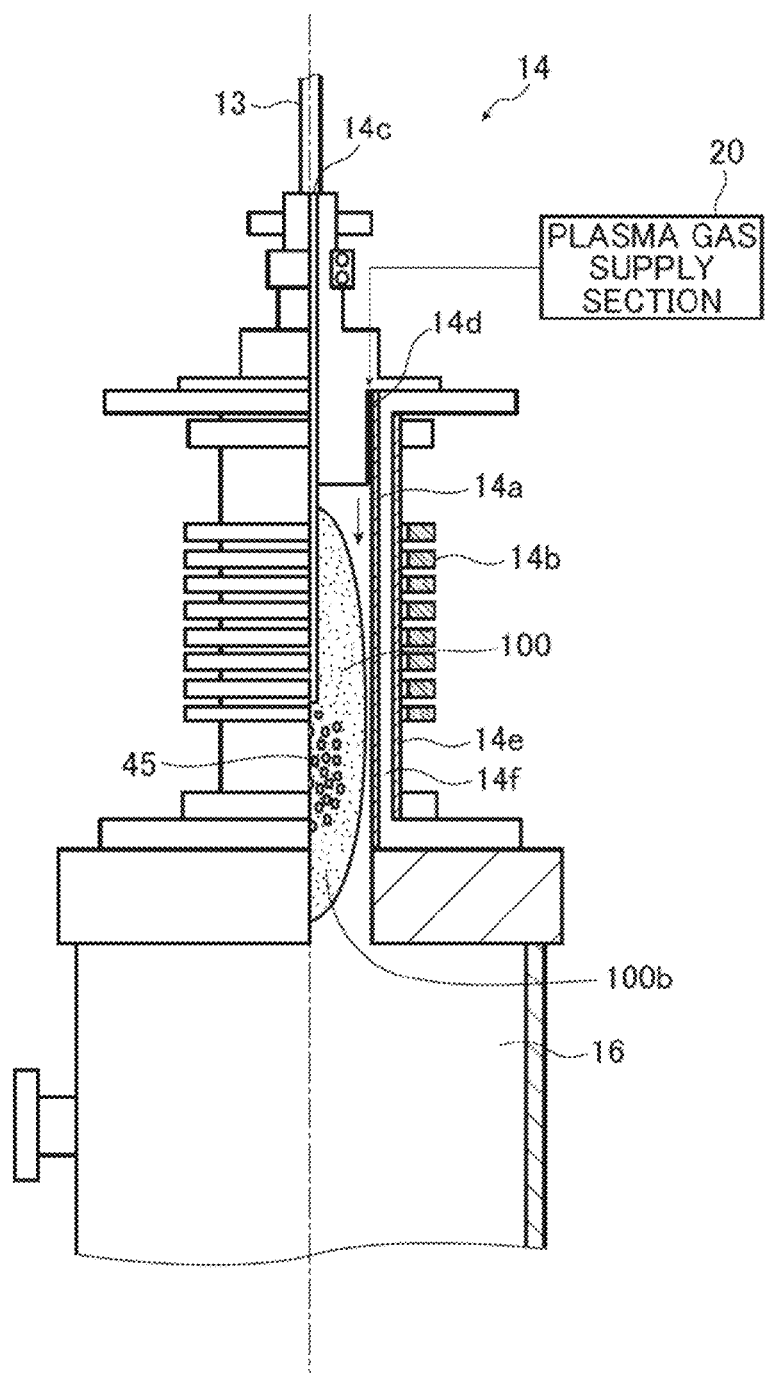
FIG. 2 is a partial cross-sectional view schematically showing one example of a plasma torch of the fine particle manufacturing apparatus according to the embodiment of the invention.

As shown in FIG. 2, the plasma torch 14 includes a quartz tube 14a and a high frequency oscillation coil 14b provided around the outer surface of the quartz tube 14a to surround the periphery of the plasma torch 14. The center portion of the top of the plasma torch 14 is provided with a supply port 14c into which the supply tube 13 is inserted, and a plasma gas supply port 14d is formed in the peripheral portion of the supply port 14c (on the same circumference).

For instance, powdery feedstock and the carrier gas such as argon gas or hydrogen gas are supplied into the plasma torch 14 through the supply tube 13.

The plasma gas supply port 14d is connected to the plasma gas supply section 20 via, for example, piping which is not shown. The plasma gas supply section 20 is configured to supply plasma gas into the plasma torch 14 through the plasma gas supply port 14d. For the plasma gas, gases such as argon gas and hydrogen gas are used alone or in combination as appropriate, for instance.

The outside of the quartz tube 14a of the plasma torch 14 is surrounded by a concentrically formed quartz tube 14e, and cooling water 14f is circulated between the quartz tubes 14a and 14e to cool the quartz tube 14a with the water, thereby preventing the quartz tube 14a from having an excessively high temperature due to the thermal plasma flame 100 generated in the plasma torch 14.

The plasma generation section 21 includes a high frequency power source (not shown) and is configured to apply a high frequency current to the high frequency oscillation coil 14b. When a high frequency current is applied to the high frequency oscillation coil 14b, the thermal plasma flame 100 is generated in the plasma torch 14.

The ambient pressure inside the plasma torch 14 is suitably determined depending on manufacturing conditions of fine particles and is, for example, not higher than the atmospheric pressure. The atmosphere with a pressure of not higher than the atmospheric pressure is not particularly limited, and for example, the pressure may range from 5 Torr (666.5 Pa) to 750 Torr (99.975 kPa).

As to the chamber 16, as shown in FIG. 1, from the side closer to the plasma torch 14, an upstream chamber 16a is attached to the plasma torch 14 to be concentric therewith. A downstream chamber 16b is provided perpendicularly to the upstream chamber 16a, and on a further downstream side, there is provided a collection section 18 including a desired filter 18a for collecting fine particles. In the manufacturing apparatus 10, a fine particle collection site is for example the filter 18a.

The chamber 16 is connected with the gas supply section 22. Quenching gas supplied from the gas supply section 22 is used to generate fine particles (not shown) of a material corresponding to the feedstock in the chamber 16. The chamber 16 also serves as a cooling tank.

The collection section 18 includes a collection chamber having the filter 18a, and a vacuum pump 18b connected through a pipe provided at a lower portion of the collection chamber. The fine particles transported from the chamber 16 are sucked by the vacuum pump 18b to be introduced into the collection chamber, and those fine particles remaining on the surface of the filter 18a are collected.

The gas supply section 22 is configured to supply quenching gas into the thermal plasma flame 100 in the chamber 16. The quenching gas serves as cooling gas. The gas supply section 22 includes a gas supply source (not shown) storing gas and a pressure application section (not shown) such as a compressor or a blower which applies push-out pressure to the quenching gas to be supplied into the chamber 16. Further, a regulating valve (not shown) controlling the amount of gas supplied from the gas supply source is provided. The gas supply source for use is determined depending on the composition of the quenching gas. The type of the gas is not limited to a single type, and when the quenching gas is a mixed gas, a plurality of gas supply sources are prepared.

The type of the quenching gas is not particularly limited as long as it exercises a cooling function. Inert gases unreactive with the feedstock, such as argon gas, nitrogen gas and helium gas, are usable as the quenching gas, for example. The quenching gas may additionally contain hydrogen gas. The quenching gas may contain reactive gas that reacts with the feedstock. Examples of the reactive gas include various types of hydrocarbon gases having 4 or less carbon atoms, such as methane, ethane, propane, butane, acetylene, ethylene, propylene and butene.

The gas supply section 22 supplies the quenching gas (cooling gas) at an angle of, for example, 45 degrees toward a tail portion 100b of the thermal plasma flame 100 (see FIG. 2), i.e., the end of the thermal plasma flame 100 on the opposite side from the plasma gas supply port 14d, that is, a terminating portion of the thermal plasma flame 100, and also supplies the quenching gas (cooling gas) downward along an inner wall of the chamber 16. However, the configuration is not limited to supplying the quenching gas to the terminating portion of the thermal plasma flame 100.

The quenching gas supplied from the gas supply section 22 into the chamber 16 rapidly cools the mixture having been converted to a gas phase state with the thermal plasma flame 100, thereby obtaining fine particles of a material corresponding to the feedstock. Besides, the quenching gas above has additional functions such as contribution to classification of fine particles.

Immediately after fine particles of a material corresponding to the feedstock is generated, if the fine particles collide with each other to form agglomerates, this causes nonuniform particle size, resulting in lower quality. However, since the quenching gas is supplied toward the tail portion 100b (terminating portion) of the thermal plasma flame, the fine particles are diluted with the quenching gas and thereby prevented from colliding with each other to agglomerate together.

In addition, since the quenching gas is supplied along the inner wall surface of the chamber 16, the fine particles are prevented from adhering to the inner wall of the chamber 16 in the process of collection of the fine particles, whereby the yield of the generated fine particles is improved.

The gas supply section 22 is provided to supply the quenching gas to the thermal plasma flame 100 as described above, and the quenching gas is supplied such that the amount of supply of the quenching gas is not constant but time-modulated. The time-based change of the amount of supply is not particularly limited and may assume any of sinusoidal, triangular, rectangular and sawtooth waveforms. The time modulation of the amount of supply of the quenching gas increases a cooling effect, and this makes it possible to manufacture fine particles with a smaller size.

For the time modulation of the quenching gas in the gas supply section 22, for instance, while the amount of supply from the gas supply source is kept constant, a regulating valve such as a ball valve is used to time-modulate the amount of supply.

The method of supplying the quenching gas to the thermal plasma flame 100 by the gas supply section 22 is not particularly limited, and the quenching gas may be supplied from a single direction. Alternatively, the quenching gas may be supplied from plural directions surrounding the periphery of the thermal plasma flame 100. In this case, plural supply ports for the quenching gas are provided at the outer peripheral surface of the chamber 16 along the circumferential direction, for example, at regular intervals, although the arrangement at regular intervals is not essential.

When the quenching gas is supplied from plural directions, the supply timing is not particularly limited, and the quenching gas is supplied from plural directions in a synchronized manner. Alternatively, the quenching gas may be supplied in a clockwise or counterclockwise order, for instance. In this case, the quenching gas generates a gas flow such as a swirl flow in the chamber 16. When supplied from plural directions, the quenching gas may be supplied in a random order without determining the order of supply.

As described above, the feedstock supply section 12 is provided to supply the feedstock into the thermal plasma flame 100 and supply the feedstock in a predetermined amount, i.e., in a fixed amount regardless of time.

The feedstock supply section 12 may also be configured to supply the feedstock into the thermal plasma flame 100 while time-modulating the amount of supply of the feedstock into the thermal plasma flame 100. This configuration brings about the time-based change even when the thermal plasma flame 100 is not changed.

In this case, the supply tube 13 is provided with the intermittent supply section 15, for example. The feedstock is supplied into the chamber 16 while being time-modulated by means of the intermittent supply section 15. The change of the amount of supply of the feedstock is not particularly limited and may assume any of sinusoidal, triangular, rectangular and sawtooth waveforms.

In the time modulation, the supply of the quenching gas and that of the feedstock preferably exhibit the same time-based change expressed as a function. This configuration makes it easy to adjust the timings of supply of the quenching gas and that of the feedstock to each other.

For the intermittent supply section 15, for instance, a solenoid valve connected to the supply tube 13 is used to time-modulate the amount of supply of the feedstock. The control section 24 controls the opening and closing of the solenoid valve. A ball valve may be used instead of the solenoid valve. Also in this case, the control section 24 controls the opening and closing of the ball valve. The control section 24 time-modulates the amount of supply of the feedstock in such a manner that the amount of supply of the feedstock is decreased when the amount of supply of the quenching gas is large and the amount of supply of the feedstock is increased when the amount of supply of the quenching gas is small. This configuration makes it possible to manufacture fine particles with a smaller size.

As described above, the manufacturing apparatus 10 is capable of supplying the quenching gas while time-modulating the gas, so that the thermal plasma flame can be further cooled and thus a low temperature state can be established. Accordingly, it is possible to manufacture fine particles with a smaller size.

In addition, the manufacturing apparatus 10 is capable of also time-modulating the supply of the feedstock. In this case, owing to the time modulation of supply of the feedstock along with the time modulation of supply of the quenching gas, it is possible to manufacture fine particles with a still smaller size. In regard to the timings of supply of the quenching gas and that of the feedstock, it is preferable to increase the supply of the feedstock when the amount of supply of the quenching gas is small.

Next, a fine particle manufacturing method using the manufacturing apparatus 10 above is described below taking metal fine particles as an example.

First, for example, Si powder having an average particle size of not more than 10 μm is charged into the feedstock supply section 12 as the feedstock powder for metal fine particles.

Argon gas and hydrogen gas are used as the plasma gas, for example, and a high frequency voltage is applied to the high frequency oscillation coil 14b (see FIG. 2) to generate the thermal plasma flame 100 in the plasma torch 14.

Further, for instance, mixed gas of argon gas and methane gas is supplied as the quenching gas from the gas supply section 22 to the tail portion 100b of the thermal plasma flame 100 (see FIG. 2), i.e., the terminating portion of the thermal plasma flame 100.

Next, the Si powder is transported with gas, e.g., argon gas used as the carrier gas and supplied into the thermal plasma flame 100 in the plasma torch 14 through the supply tube 13 (first step). The supplied Si powder is evaporated in the thermal plasma flame 100 and becomes the mixture 45 in a gas phase state (see FIG. 2).

In this process, the quenching gas is supplied to the thermal plasma flame 100 while the quenching gas is time-modulated, that is, the amount of supply thereof is periodically changed (second step). Consequently, the thermal plasma flame 100 is rapidly cooled whereby Si fine particles (metal fine particles) are generated. At this time, a low temperature region is formed in the chamber 16, so that the Si fine particles with a smaller size can be obtained.

Then, the Si fine particles obtained in the chamber 16 are collected on the filter 18a of the collection section 18 owing to negative pressure (suction force) applied from the collection section 18 by the vacuum pump 18b.

While the quenching gas is time-modulated in the manufacturing apparatus 10, the supply of the feedstock may also be time-modulated. In this case, it is preferable to increase the supply of the feedstock when the amount of supply of the quenching gas is small. The timings of supply of the quenching gas and that of the feedstock are controlled by the control section 24.

Next, another example of the fine particle manufacturing apparatus is described.

Figure 3:
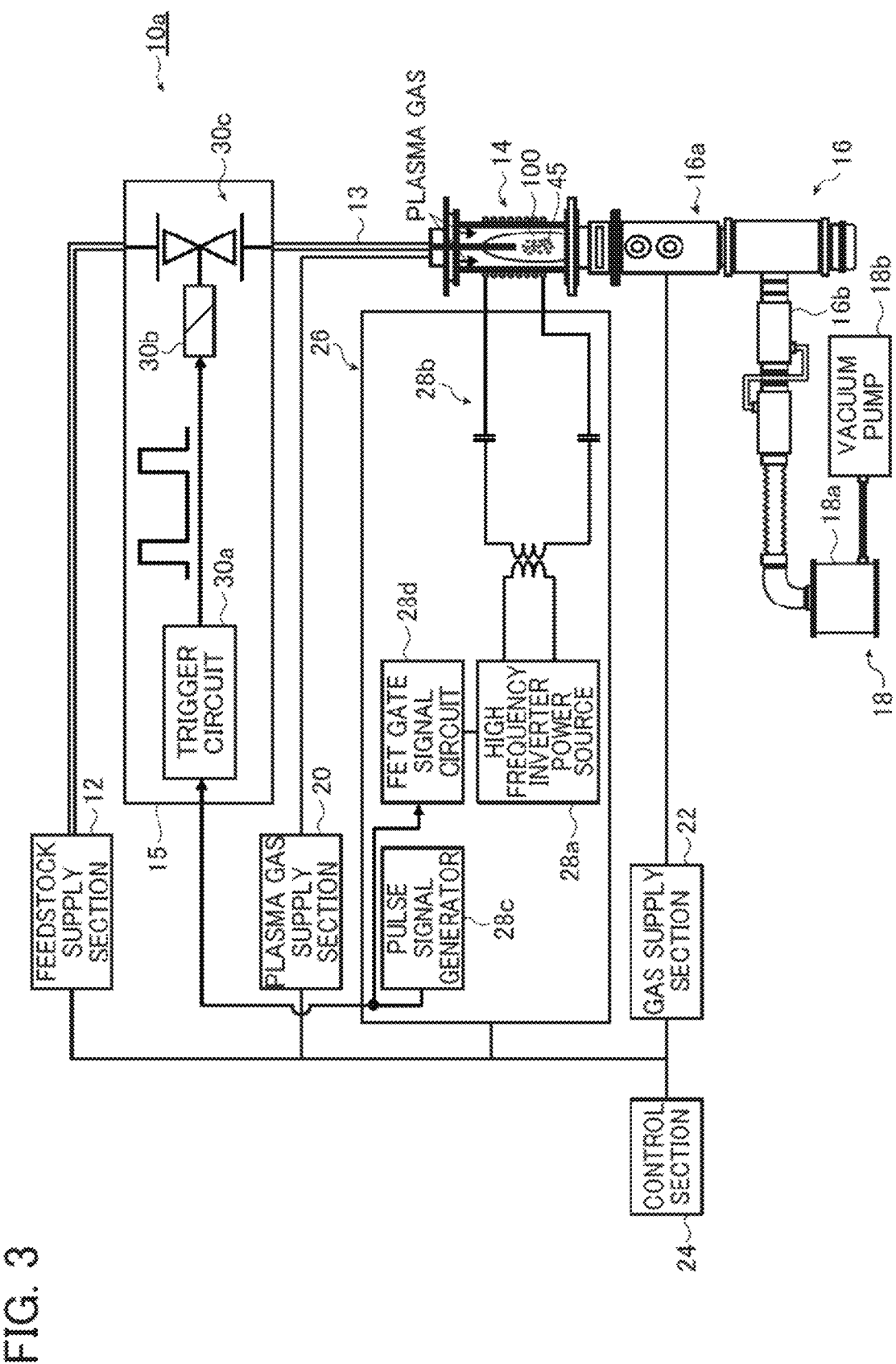
FIG. 3 is a schematic view showing another example of the fine particle manufacturing apparatus according to the embodiment of the invention.
Figure 4:
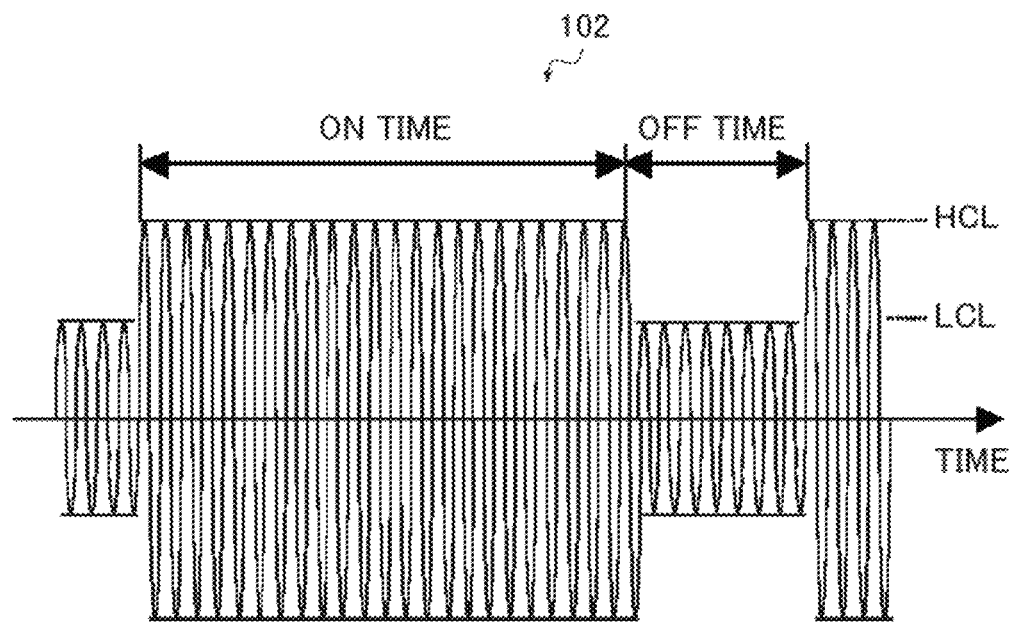
FIG. 4 is an explanatory view illustrating a time-based change of a coil current during pulse modulation.

FIG. 3 is a schematic view showing another example of the fine particle manufacturing apparatus according to the embodiment of the invention, and FIG. 4 is an explanatory view illustrating a time-based change of a coil current during pulse modulation.

For a fine particle manufacturing apparatus 10a (hereinafter referred to simply as "manufacturing apparatus 10a") shown in FIG. 3, constituent elements identical to those of the manufacturing apparatus 10 shown in FIG. 1 are assigned the same reference signs and will not be described in detail.

The manufacturing apparatus 10a shown in FIG. 3 is different from the manufacturing apparatus 10 shown in FIG. 1 in that a high frequency modulated induction thermal plasma generation section 26 is provided in place of the plasma generation section 21 (see FIG. 1), and otherwise has the same configuration as the manufacturing apparatus 10 shown in FIG. 1.

In the manufacturing apparatus 10a, the feedstock supply section 12 is connected to the intermittent supply section 15 as with the manufacturing apparatus 10 shown in FIG. 1. The intermittent supply section 15 is connected to the plasma torch 14 through the hollow supply tube 13. As described above, the high frequency modulated induction thermal plasma generation section 26 is provided in place of the plasma generation section 21 (see FIG. 1). The high frequency modulated induction thermal plasma generation section 26 is used to generate the thermal plasma flame 100 in the plasma torch 14 while time-modulating the temperature state of the thermal plasma flame 100 in such a manner that the temperature state of the thermal plasma flame 100 is periodically switched between the high temperature state and the low temperature state having a lower temperature than the high temperature state.

The thermal plasma flame that is periodically switched between the high temperature state and the low temperature state having a lower temperature than the high temperature state at predetermined time intervals, i.e., that is time-modulated in terms of the temperature state, is called a modulated induction thermal plasma flame.

The feedstock supply section 12 is connected to a valve 30c of the intermittent supply section 15 disposed above the plasma torch 14.

The high frequency modulated induction thermal plasma generation section 26 is capable of supplying a high frequency current for generating the thermal plasma flame 100 to the high frequency oscillation coil 14b (see FIG. 2) while amplitude-modulating the high frequency current supplied to the high frequency oscillation coil 14b at predetermined time intervals. The high frequency current supplied to the high frequency oscillation coil 14b to generate the thermal plasma flame 100 is hereinafter called "coil current."

The high frequency modulated induction thermal plasma generation section 26 includes a high frequency inverter power source 28a, an impedance matching circuit 28b, a pulse signal generator 28c and an FET gate signal circuit 28d.

A MOSFET inverter power source constituting the high frequency inverter power source 28a has the function of modulating the amplitude of electric current and therefore can amplitude-modulate the coil current.

The high frequency inverter power source 28a includes, for instance, a rectifier circuit and a MOSFET inverter circuit. In the high frequency inverter power source 28a, the rectifier circuit uses, for example, a three-phase alternating current as the input power; the three-phase alternating current is converted from the alternating current to the direct current through a three-phase full-wave rectifier circuit, and the output voltage value thereof is changed through a DC-DC converter using an IGBT (Insulated Gate Bipolar Transistor).

The MOSFET inverter circuit is connected to the rectifier circuit and converts the direct current obtained from the rectifier circuit into the alternating current. Thus, the inverter output, i.e., the coil current is amplitude-modulated (AM-modulated).

The output side of the high frequency inverter power source 28a is connected with the impedance matching circuit 28b. The impedance matching circuit 28b is constituted of a series resonant circuit composed of a capacitor and a resonant coil and carries out impedance matching such that a resonance frequency of load impedance including plasma load falls within a drive frequency range of the high frequency inverter power source 28a.

The pulse signal generator 28c generates a pulse control signal for adding square wave modulation to the amplitude of the coil current used to maintain high frequency modulated induction thermal plasma.

The FET gate signal circuit 28d supplies a modulation signal generated based on a pulse control signal generated by the pulse signal generator 28c, to the gate of a MOSFET of the MOSFET inverter circuit of the high frequency inverter power source 28a. Thus, the coil current can be amplitude-modulated by use of a pulse control signal generated by the pulse signal generator 28c such that the amplitude relatively increases or decreases, and for example, the coil current can be pulse-modulated like a square wave 102 shown in FIG. 4. The pulse modulation of the coil current allows the thermal plasma flame 100 to be periodically switched between the high temperature state and the low temperature state having a lower temperature than the high temperature state at predetermined time intervals. In the high frequency modulated induction thermal plasma generation section 26, the high frequency current may be simply supplied to the high frequency oscillation coil 14b, thereby generating a thermal plasma flame having a constant temperature state.

When the feedstock is intermittently supplied, the feedstock is supplied in synchronization with the high temperature state of the thermal plasma flame 100 so that the feedstock is completely evaporated in the high temperature state to have the mixture 45 in a gas phase state (see FIG. 2), while in the low temperature state, the feedstock is not supplied and the amount of supply of the quenching gas is increased to rapidly cool the mixture 45 in a gas phase state (see FIG. 2).

In the square wave 102 shown in FIG. 4, the high value (HCL) and the low value (LCL) of the current amplitude are defined for the coil current, and the time having HCL and the time having LCL in one modulation cycle are defined as the ON time and the OFF time, respectively. Further, the percentage of the ON time in one cycle: (ON time/(ON time+ OFF time)×100(%)) is defined as a duty factor (DF). The current amplitude factor (LCL/HCL×100(%)) of the coil is defined as a current modulation factor (SCL).

The ON time, the OFF time and one cycle in the square wave 102 are each preferably on the order of microseconds to several seconds.

When the coil current is amplitude-modulated using a pulse control signal, the amplitude modulation is preferably carried out using a predetermined waveform, e.g., a square wave. However, the waveform is not limited to a square wave, and needless to say, use may be made of a waveform formed of a repetitive wave including a curved line having a triangle wave, a sawtooth wave, a reverse sawtooth wave, a sine wave or the like.

In the time modulation, the switch of the thermal plasma flame between the high temperature state and the low temperature state, the supply of the quenching gas, and the supply of the feedstock preferably exhibit the same time-based change expressed as a function. This configuration makes it easy to adjust the timings of supply of the quenching gas, that of the feedstock, and the temperature state of the thermal plasma flame to each other.

The intermittent supply section 15 is provided to intermittently supply the feedstock into the plasma torch 14. The intermittent supply section 15 includes a trigger circuit 30a, an electromagnetic coil 30b and a valve 30c.

The trigger circuit 30a is connected to the pulse signal generator 28c and is configured to receive a pulse control signal from the pulse signal generator 28c and generate a TTL level signal in synchronization with the received pulse control signal.

The electromagnetic coil 30b is connected to the trigger circuit 30a and is configured to open and close the valve 30c based on the TTL level signal from the trigger circuit 30a.

The valve 30c is used to control the entry of the feedstock for fine particle manufacturing that is, for example together with the carrier gas, supplied from the feedstock supply section 12, into the plasma torch 14. The opening and closing of the valve 30c is controlled by the electromagnetic coil 30b as described above. With this configuration, the feedstock is intermittently supplied to the thermal plasma flame 100 in the high temperature state.

Figure 5A:
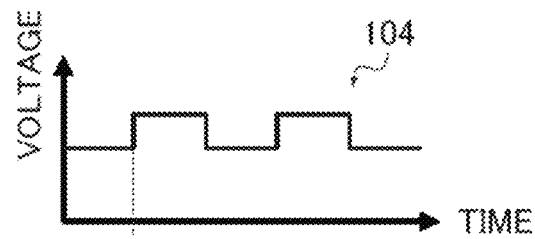
FIG. 5A is a graph showing a pulse control signal for modulating a coil current.
Figure 5B:
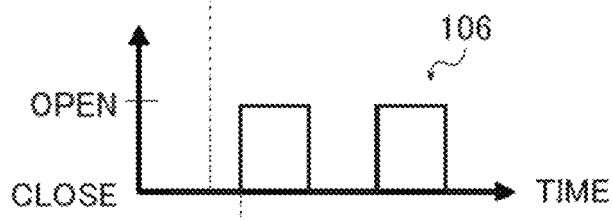
FIG. 5B is a graph showing opening and closing timing of a valve.
Figure 5C:
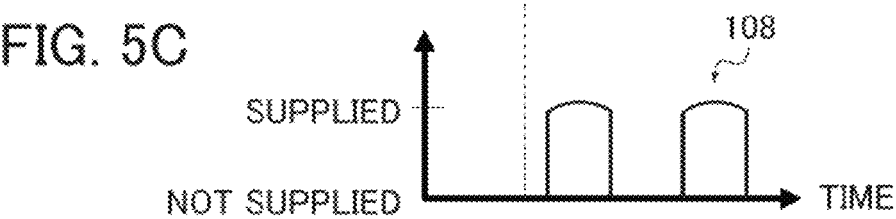
FIG. 5C is a graph showing supply of feedstock.

In this embodiment, a pulse control signal 104 shown in FIG. 5A is output from the pulse signal generator 28c, and a TTL level signal synchronized with the pulse control signal 104 is generated in the trigger circuit 30a. The valve 30c is opened and closed at predetermined time intervals in response to a timing signal 106 shown in FIG. 5B based on the TTL level signal. Consequently, for instance, the feedstock powder is intermittently supplied into the plasma torch 14 as represented by a waveform 108 shown in FIG. 5C, so that the feedstock can be intermittently supplied to the thermal plasma flame 100 in the high temperature state.

Further, the timing of supply of the quenching gas is controlled based on the TTL level signal. This configuration makes it possible to adjust the timings of supply of the quenching gas, that of the feedstock, and the temperature state of the thermal plasma flame to each other with high accuracy.

In the manufacturing apparatus 10a, the timing of high and low temperature states of the thermal plasma flame 100 as above may be feedback-controlled. Besides, the opening and closing timing of the valve 30c may be controlled. In this case, a signal acting to shift the phase of a TTL level signal generated by the trigger circuit 30a, i.e., the phase of an input signal to the electromagnetic coil 30b is generated and supplied to the trigger circuit 30a. This configuration makes it possible to adjust the timing of supply of the feedstock to the high temperature state of the thermal plasma flame, that is, the ON time.

Thus, in the manufacturing apparatus 10a, in addition to the time modulation of the quenching gas, the supply of the feedstock and the temperature of the thermal plasma flame can be time-modulated. Owing to the adjusted timing of time modulation, it is possible to manufacture fine particles with a still smaller size.

While the high frequency modulated induction thermal plasma generation section 26 and the intermittent supply section 15 work cooperatively in the manufacturing apparatus 10a, the invention is not limited thereto, and the intermittent supply section 15 may operate independently. Accordingly, the intermittent supply section 15 can supply the feedstock without time modulation, for example. In this case, the thermal plasma flame is solely time-modulated, and the amount of supply of the feedstock is constant regardless of time.

In the manufacturing apparatus 10a, the quenching gas, the feedstock, and the temperature of the thermal plasma flame can be time-modulated as described above; however, as in the manufacturing apparatus 10, the supply of the quenching gas and that of the feedstock may be time-modulated, or alternatively, the quenching gas and the temperature of the thermal plasma flame may be time-modulated.

While the temperature of the thermal plasma flame is time-modulated in the manufacturing apparatus 10a, a spectroscopic analysis may be employed as described in JP 5564370 B. In this case, a modulated induction thermal plasma flame is spectroscopically analyzed, and the temperature state of the modulated induction thermal plasma flame is time-modulated by a high frequency modulated induction thermal plasma generation section based on the intensity of, of emitted light from the modulated induction thermal plasma flame, light with a wavelength derived from the feedstock.

Next, a fine particle manufacturing method using the manufacturing apparatus 10a above is described below taking metal fine particles as an example. The fine particle manufacturing method using the manufacturing apparatus 10a is different from the foregoing fine particle manufacturing method using the manufacturing apparatus 10 in that the thermal plasma flame is time-modulated, and otherwise has the same procedures.

Also in the fine particle manufacturing method using the manufacturing apparatus 10a, for example, Si powder having an average particle size of not more than 10 μm is used. The carrier gas, the plasma gas and the quenching gas are the same as those in the fine particle manufacturing method using the manufacturing apparatus 10 described above.

A thermal plasma flame is generated in the plasma torch 14. In this process, the temperature state of the flame is time-modulated to periodically switch between the high temperature state and the low temperature state having a lower temperature than the high temperature state, thus forming a modulated induction thermal plasma flame.

Si powder is transported with gas, e.g., argon gas and supplied into the thermal plasma flame (modulated induction thermal plasma flame) (first step). The supplied Si powder is evaporated in the thermal plasma flame (modulated induction thermal plasma flame) and becomes the mixture 45 in a gas phase state (see FIG. 2).

In this process, the quenching gas is supplied to the thermal plasma flame while the amount of supply of the gas is periodically changed (second step). Consequently, the thermal plasma flame is rapidly cooled whereby Si fine particles (metal fine particles) are generated. At this time, a low temperature region is formed in the chamber 16, so that the Si fine particles with a still smaller size can be obtained. The amount of supply of the quenching gas is preferably larger in the low temperature state of the thermal plasma flame than in the high temperature state of the thermal plasma flame. In this case, the amount of supply of the quenching gas is more preferably zero in the high temperature state of the thermal plasma flame.

Then, the Si fine particles obtained in the chamber 16 are collected on the filter 18a of the collection section 18 owing to negative pressure (suction force) applied from the collection section 18 by the vacuum pump 18b, as described above.

While the quenching gas and the thermal plasma flame are time-modulated in the manufacturing apparatus 10a, the supply of the feedstock may also be time-modulated. In this case, the amount of supply of the feedstock is preferably larger in the high temperature state of the modulated induction thermal plasma flame than in the low temperature state of the modulated induction thermal plasma flame. In this case, the amount of supply of the feedstock is more preferably zero in the low temperature state of the modulated induction thermal plasma flame. This configuration makes it possible to completely evaporate the feedstock in the high temperature state to convert it into the gas phase state.

Besides, it is preferable to increase the supply of the feedstock when the amount of supply of the quenching gas is small, as described above. The timing of supply of the quenching gas, the timing of switch of the temperature state of the thermal plasma flame, and the timing of supply of the feedstock are controlled by the control section 24.

Next, the time modulation of the quenching gas, the feedstock, and the temperature of the thermal plasma flame in the manufacturing apparatus 10 and the manufacturing apparatus 10a is described.

Figure 6A:
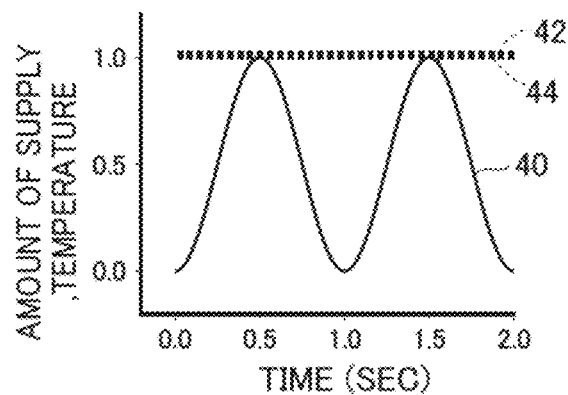
FIG. 6A is a graph showing a first example of time modulation of quenching gas, the feedstock, and the temperature of a thermal plasma flame.
Figure 6B:
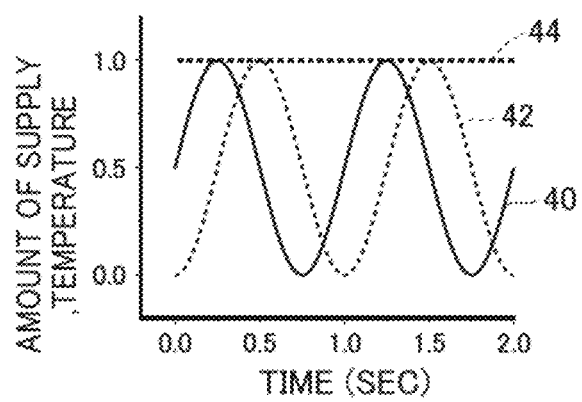
FIG. 6B is a graph showing a second example of time modulation of the quenching gas, the feedstock, and the temperature of the thermal plasma flame.
Figure 6C:
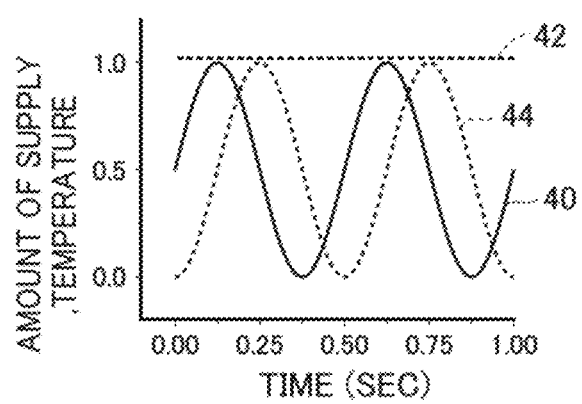
FIG. 6C is a graph showing a third example of time modulation of the quenching gas, the feedstock, and the temperature of the thermal plasma flame.
Figure 6D:
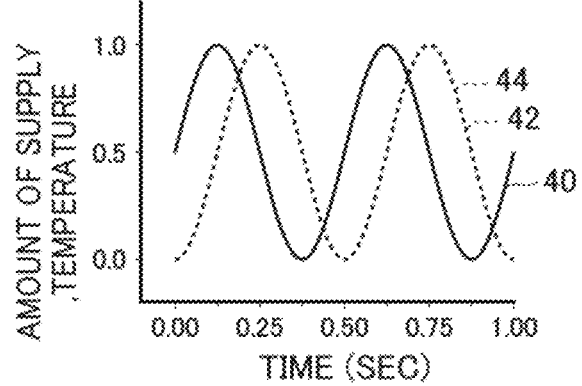
FIG. 6D is a graph showing a fourth example of time modulation of the quenching gas, the feedstock, and the temperature of the thermal plasma flame.

FIG. 6A is a graph showing a first example of time modulation of the quenching gas, the feedstock, and the temperature of the thermal plasma flame; FIG. 6B is a graph showing a second example of time modulation of the quenching gas, the feedstock, and the temperature of the thermal plasma flame; FIG. 6C is a graph showing a third example of time modulation of the quenching gas, the feedstock, and the temperature of the thermal plasma flame; and FIG. 6D is a graph showing a fourth example of time modulation of the quenching gas, the feedstock, and the temperature of the thermal plasma flame.

FIGS. 6A to 6D each show the quenching gas, the feedstock, and the temperature of the thermal plasma flame, where reference sign 40 denotes the quenching gas, reference sign 42 the feedstock, and reference sign 44 the thermal plasma flame. FIGS. 6A to 6D each show the time on the horizontal axis, and the normalized amount of supply and the normalized temperature on the vertical axis. In FIGS. 6A to 6D, a smaller value on the vertical axis refers to a smaller amount of supply or a lower temperature. A larger value on the vertical axis refers to a larger amount of supply or a higher temperature.

In the manufacturing apparatus 10 and the manufacturing apparatus 10a, for instance, only the quenching gas can be time-modulated in the form of, for instance, a sinusoidal wave with the feedstock and the thermal plasma flame being constant, as shown in FIG. 6A.

Alternatively, the quenching gas and the feedstock can be time-modulated in the form of, for instance, a sinusoidal wave with the thermal plasma flame being constant as shown in FIG. 6B. In this case, the quenching gas and the feedstock have phases shifted from each other, and the amount of supply of the feedstock is decreased when the amount of supply of the quenching gas is large. This configuration makes it possible to manufacture fine particles with a smaller size.

In the manufacturing apparatus 10a, for instance, the quenching gas and the thermal plasma flame can be time-modulated in the form of, for instance, a sinusoidal wave with the feedstock being constant, as shown in FIG. 6C. In this case, the quenching gas and the thermal plasma flame have phases shifted from each other, and the thermal plasma flame is in the low temperature state when the amount of supply of the quenching gas is large. This configuration makes it possible to manufacture fine particles with a smaller size.

Furthermore, in the manufacturing apparatus 10a, for instance, the quenching gas, the feedstock and the thermal plasma flame can be time-modulated in the form of, for instance, a sinusoidal wave, as shown in FIG. 6D. In this case, the quenching gas, the feedstock and the thermal plasma flame have phases shifted from each other, and the amount of supply of the feedstock is decreased and the thermal plasma flame is in the low temperature state when the amount of supply of the quenching gas is large. This configuration makes it possible to manufacture fine particles with a still smaller size.

Next, a cooling state owing to the time modulation of the quenching gas is described.

Figure 7:
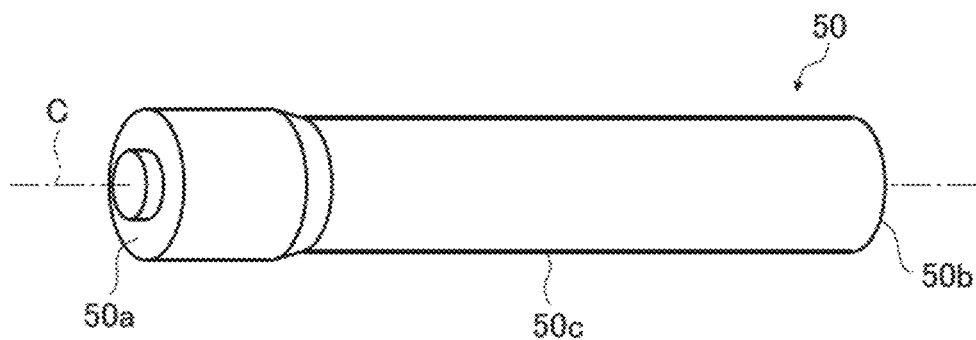
FIG. 7 is a schematic perspective view showing a model used in numeric calculation.

FIG. 7 is a schematic perspective view showing a model used in numeric calculation.

A model 50 shown in FIG. 7 used in the numeric calculation is obtained by modeling a lower end portion of the plasma torch 14 and the chamber 16 into a numerically analyzable form and assumes a cylindrical shape. One end 50a corresponds to the thermal plasma flame side, and the other end 50b corresponds to the opposite side from the thermal plasma flame side. A quenching gas supply section 50c is set in the model 50. The supply section 50c has the configuration in which the quenching gas is supplied from eight directions at regular intervals. Reference sign C of the model 50 represents the central axis.

For the cylindrical model 50, a temperature distribution in a cross section containing the central axis C was obtained through the numeric calculation.

The numeric calculation was carried out using an equation of motion, an equation of continuity and an energy conservation equation with COMSOL Multiphysics (registered trademark).

In the numeric calculation, heat was applied to the one end 50a of the model 50 as the boundary condition. Calculation conditions were a condition where only the flow rate of the quenching gas was time-modulated (see FIGS. 8A to 8D) and a condition where the thermal plasma flame and the flow rate of the quenching gas were time-modulated (see FIGS. 12A to 12H). For comparison purposes, the numeric calculation was carried out also for models with no time modulation (see FIGS. 9A to 9D).

Argon gas was used as the quenching gas. For the flow rate of the quenching gas, the maximum flow rate was set to 50 l/min and the average flow rate was set to 25 l/min. In those models with the thermal plasma flame and the flow rate of the quenching gas being time-modulated, a phase difference was set to π/2. The cycle of time modulation of the quenching gas was set to 1 second.

Figure 8A:
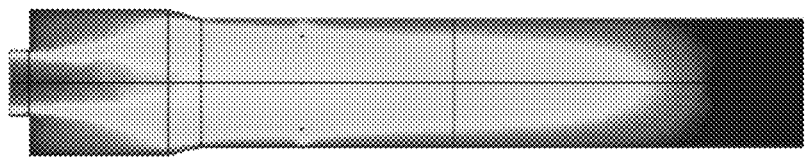
FIGS. 8A to 8D are schematic views showing temperature distributions when the quenching gas was time-modulated.
Figure 8B:
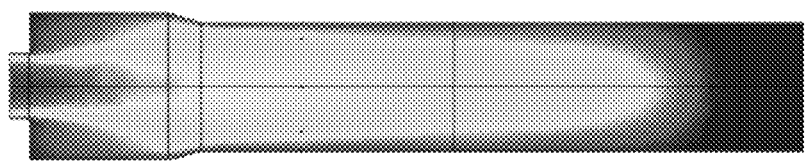
Figure 8C:
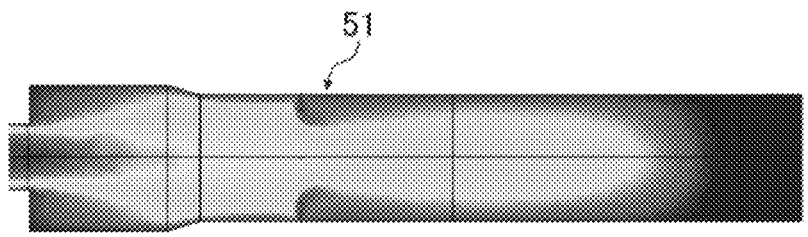
Figure 8D:
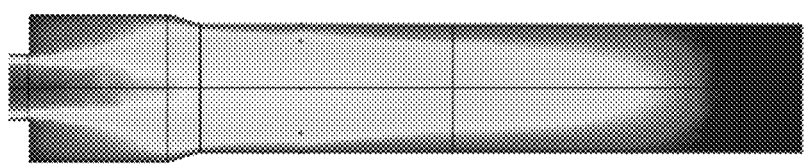
Figure 9A:
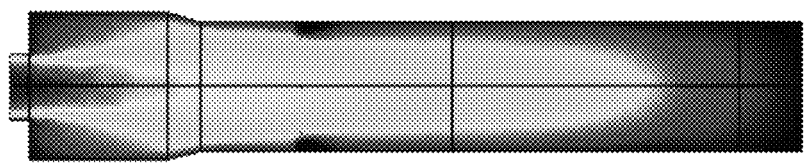
FIGS. 9A to 9D are schematic views showing temperature distributions with no time modulation.
Figure 9B:
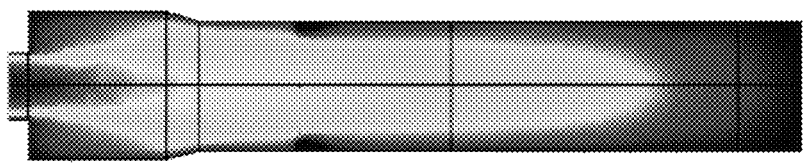
Figure 9C:
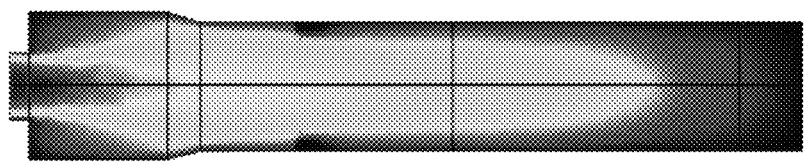
Figure 9D:
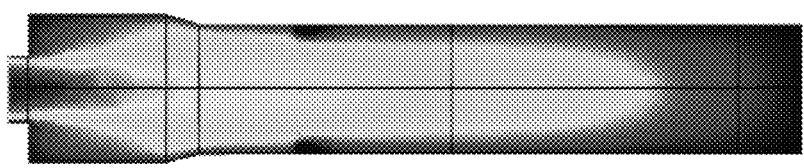

FIGS. 8A to 8D are schematic views showing temperature distributions when the quenching gas was time-modulated, and FIGS. 9A to 9D are schematic views showing temperature distributions with no time modulation. FIGS. 8A to 8D correspond to FIGS. 9A to 9D, respectively, and each corresponding pair shows temperature distributions at the same time point. FIGS. 8A and 9A are for the time of 0.0 seconds; FIGS. 8B and 9B the time of 0.25 seconds; FIGS. 8C and 9C the time of 0.5 seconds; and FIGS. 8D and 9D the time of 0.75 seconds.

No time-based change of the temperature distribution is seen in any of FIGS. 9A to D. In contrast, for FIGS. 8A to 8D, an abrupt decrease in temperature, i.e., a region 51, can be seen in FIG. 8C. Thus, it can be understood that the time modulation of the amount of supply of the quenching gas leads to a large cooling effect. Note that the region 51 represents a vicinity of the quenching gas supply section 50c.

Figure 10:
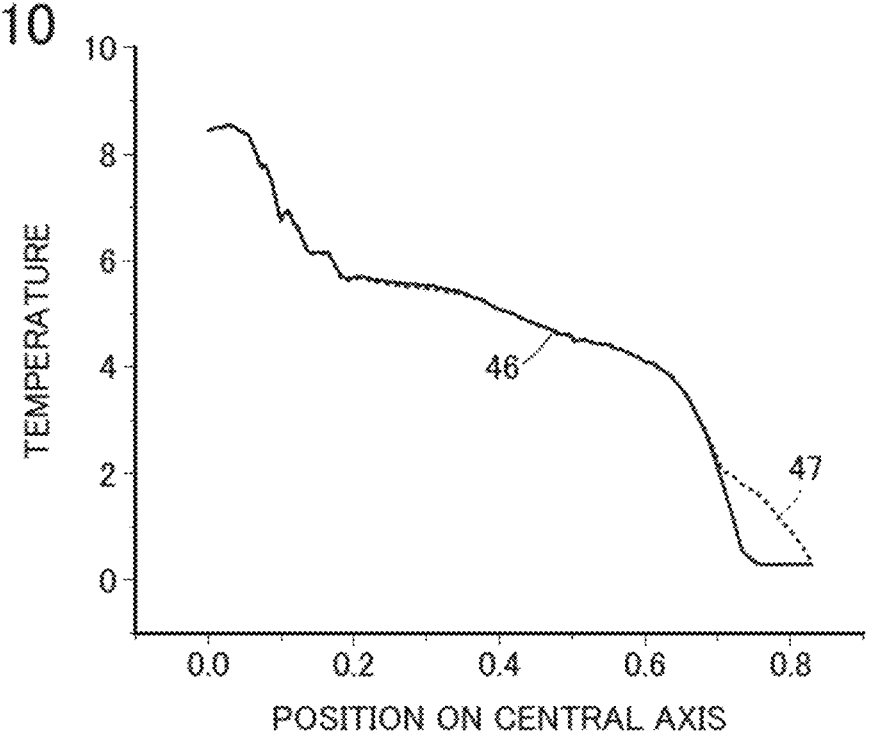
FIG. 10 is a graph showing distributions of time-averaged temperatures in the central axis of the model.
Figure 11:
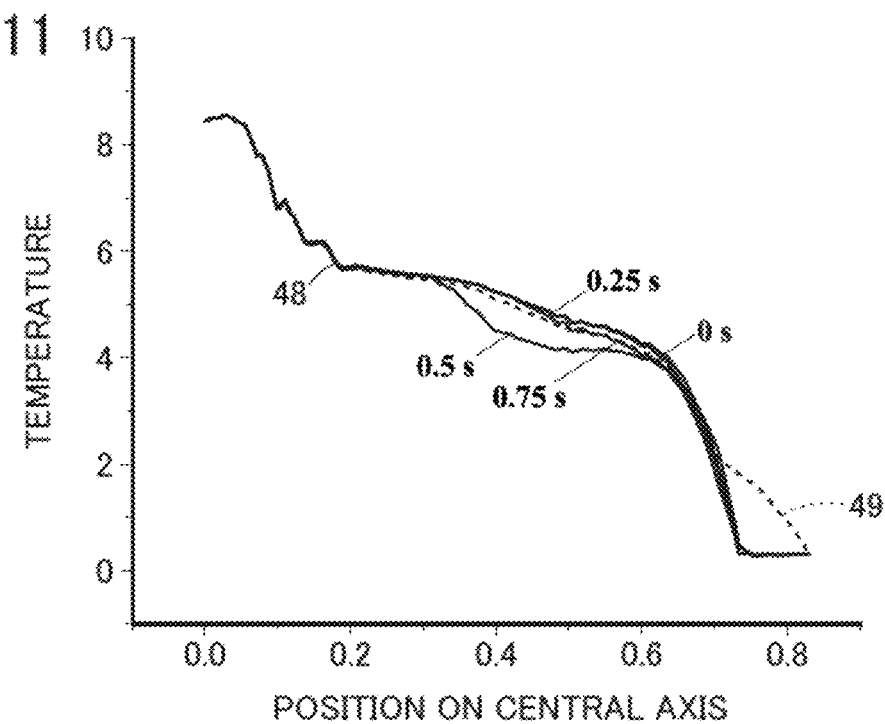
FIG. 11 is a graph showing time-based changes of temperature distributions in the central axis of the model.

FIG. 10 is a graph showing distributions of time-averaged temperatures in the central axis of the model, and FIG. 11 is a graph showing time-based changes of temperature distributions in the central axis of the model. FIGS. 10 and 11 show the results of FIGS. 8A to 8D and FIGS. 9A to 9D.

In FIGS. 10 and 11, the horizontal axis represents the position on the central axis, and the vertical axis represents the normalized temperature. In FIGS. 10 and 11, a smaller value of the position on the central axis on the horizontal axis indicates a position closer to the one end 50a of the model 50, and a larger value of the position on the central axis indicates a position closer to the other end 50b.

In FIG. 10, reference sign 46 represents the case where the quenching gas was time-modulated, and reference sign 47 represents the case with no time modulation. In FIG. 11, reference sign 48 represents the case where the quenching gas is time-modulated, and reference sign 49 represents the case with no time modulation.

As can be seen in FIG. 10, the average temperature in the central part of the chamber has no difference between the cases where the quenching gas was time-modulated and not time-modulated; however, the temperature in the case where the quenching gas was time-modulated is lower on the other end 50b side.

It can be understood from FIG. 11 that the time modulation of the amount of supply of the quenching gas leads to a lower temperature in the central part of the chamber. Owing to the use of this region having a lower temperature, a large cooling effect can be obtained, and this makes it possible to manufacture fine particles with a smaller size.

FIGS. 12A to 12H are schematic views showing temperature distributions when the thermal plasma flame and the flow rate of the quenching gas were time-modulated, and FIGS. 13A to 13H are schematic views showing trajectories of particles when the thermal plasma flame and the flow rate of the quenching gas were time-modulated. The cycle of time modulation of each of the thermal plasma flame and the flow rate of the quenching gas was set to 1 second.

For trajectories of particles, it was assumed that the quenching gas influences movement of particles while the particles do not influence the quenching gas.

The particle size was set to 100 nm, the particles were assumed to be monodisperse, and the specific heat of the particles was not taken into account. It was assumed that the particles recoil on a wall surface and do not move at the one end 50a.

FIGS. 12A to 12H correspond to FIGS. 13A to 13H, respectively, and each corresponding pair shows a temperature distribution and the state of particles at the same time point. FIGS. 12A to 12H and FIGS. 13A to 13H correspond to FIG. 6C with the thermal plasma flame and the quenching gas being changed.

Figure 12A:
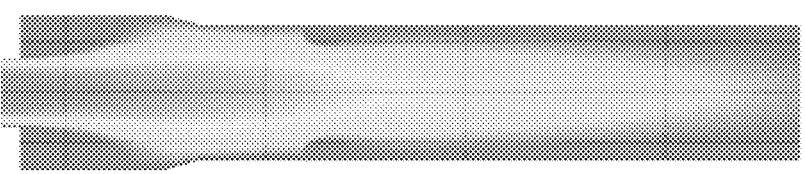
FIGS. 12A to 12H are schematic views showing temperature distributions when the thermal plasma flame and the flow rate of the quenching gas were time-modulated.
Figure 12B:
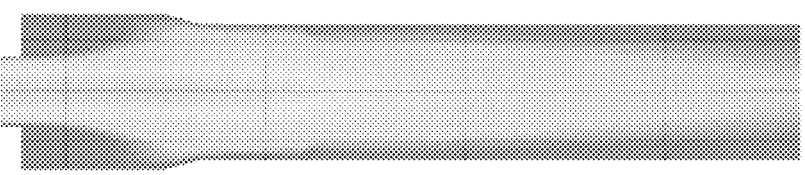
Figure 12C:
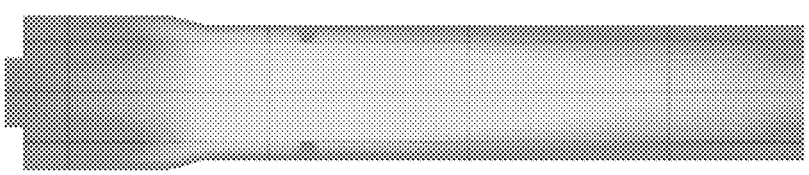
Figure 12D:
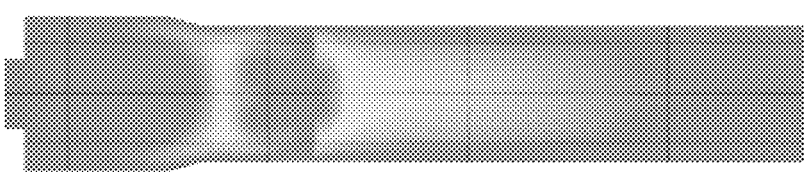
Figure 12E:
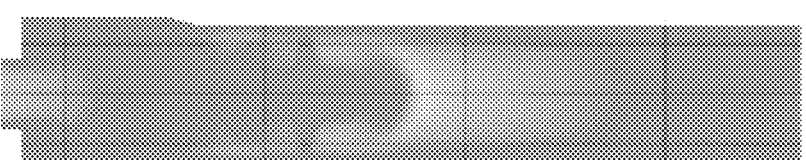
Figure 12F:
Figure 12G:
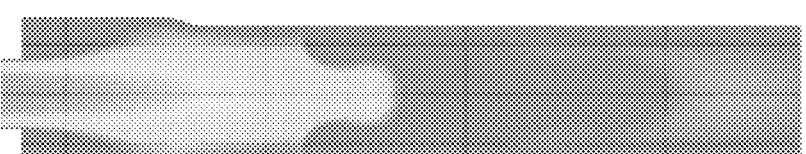
Figure 12H:
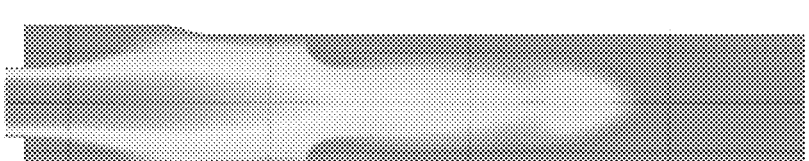
Figure 13A:
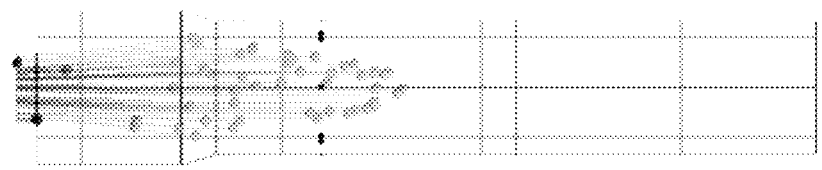
FIGS. 13A to 13H are schematic views showing trajectories of particles when the thermal plasma flame and the flow rate of the quenching gas were time-modulated.
Figure 13B:
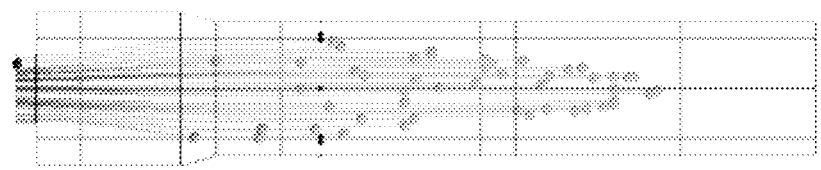
Figure 13C:
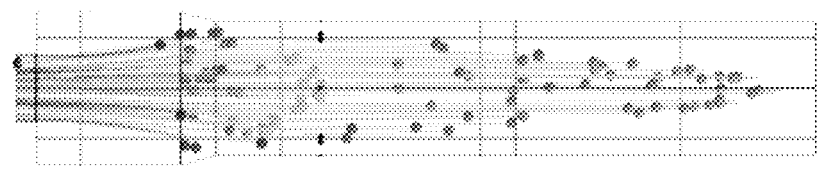
Figure 13D:
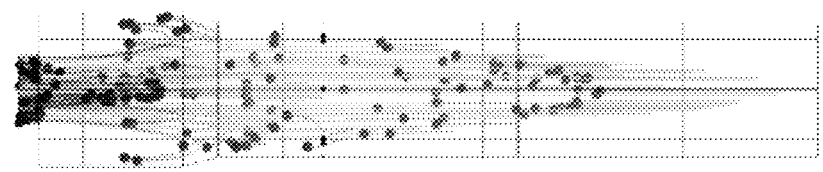
Figure 13E:
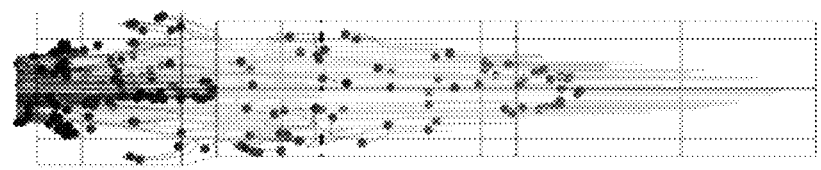
Figure 13F:
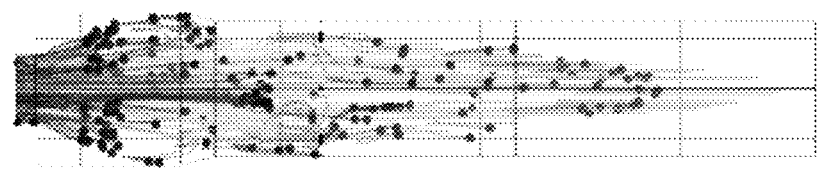
Figure 13G:
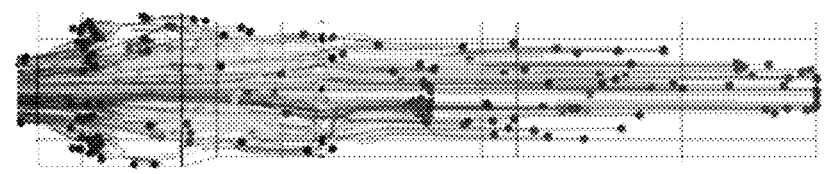
Figure 13H:
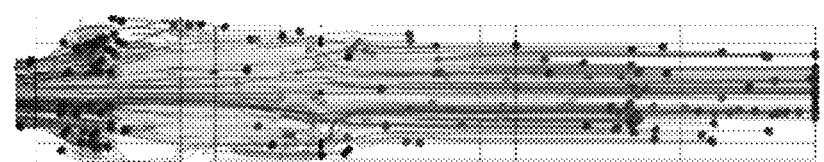

FIGS. 12A and 13A are for the time of 0.25 seconds; FIGS. 12B and 13B the time of 0.30 seconds; FIGS. 12C and 13C the time of 0.40 seconds; FIGS. 12D and 13D the time of 0.50 seconds; FIGS. 12E and 13E the time of 0.55 seconds; FIGS. 12F and 13F the time of 0.60 seconds; FIGS. 12G and 13G the time of 0.65 seconds; and FIGS. 12H and 13H the time of 0.70 seconds.

When the temperature of the thermal plasma flame is high, the temperature is in a high state in the corresponding figures, namely, FIGS. 12A and 12B as well as FIGS. 12G and 12H. In FIGS. 12C and 12D where the flow rate of the quenching gas is high, the temperature is in a low state. As shown in FIG. 12E, the quenching gas flows into the chamber, so that the temperature therein is in a low state.

For the state of particles, as shown in FIGS. 13C to 13E, particles are distributed on the one end 50*a* side and remain at or around the tail portion of the thermal plasma flame. When the flow rate of the quenching gas is high, particles are dispersed toward the other end 50*b* as shown in FIGS. 13F and 13G.

The manufacturing apparatus 10 and the manufacturing apparatus 10*a* are capable of manufacturing, for instance, nanosized Si fine particles using Si powder as the feedstock. However, the invention is not limited thereto, and particles of another element may be used as the feedstock for fine particle manufacturing to manufacture fine particles of an oxide, a metal, a nitride or a carbide of that element. In this case, the manufacture of fine particles may involve slurrying.

When the feedstock is powder, the average particle size thereof is appropriately set to allow easy evaporation of the feedstock in the thermal plasma flame and is, for example, up to 100 μm, preferably up to 10 μm and more preferably up to 5 μm when converted to the BET diameter.

For instance, any type of feedstock may be used as long as it can be evaporated by the thermal plasma flame, and the following substances are preferred. That is, there may be appropriately selected one of a single element oxide, a complex oxide, a multiple oxide, an oxide solid solution, a metal, an alloy, a hydroxide, a carbonic acid compound, a halide, a sulfide, a nitride, a carbide, a hydride, a metal salt and a metal-organic compound each of which contains at least one selected from the group consisting of the elements with the atomic numbers 3 to 6, 11 to 15, 19 to 34, 37 to 52, 55 to 60, 62 to 79 and 81 to 83.

The single element oxide refers to an oxide formed from one element in addition to oxygen, the complex oxide refers to an oxide constituted of plural types of oxides, the multiple oxide refers to a higher order oxide formed from two or more types of oxides, and the oxide solid solution refers to a solid in which different oxides are dissolved and uniformly mixed with each other. The metal refers to one consisting of one or more metallic elements alone, and the alloy refers to one constituted of two or more metallic elements with the alloy structure assuming, in some cases, the state of a solid solution, a eutectic mixture, an intermetallic compound, or a mixture thereof.

The hydroxide refers to one constituted of a hydroxyl group and one or more metallic elements, the carbonic acid compound refers to one constituted of a carbonic acid group and one or more metallic elements, the halide refers to one constituted of a halogen and one or more metallic elements, and the sulfide refers to one constituted of sulfur and one or more metallic elements. The nitride refers to one constituted of nitrogen and one or more metallic elements, the carbide refers to one constituted of carbon and one or more metallic elements, and the hydride refers to one constituted of hydrogen and one or more metallic elements. The metal salt refers to an ionic compound containing at least one or more metallic elements, and the metal-organic compound refers to an organic compound having a bond between one or more metallic elements and at least one of elements C, O and N, as exemplified by a metal alkoxide and an organometallic complex.

Examples of the single element oxide include a titanium oxide ($TiO_2$), a zirconium oxide ($Zro_2$), a calcium oxide (CaO), a silicon oxide ($SiO_2$), an aluminum oxide (alumina: $Al_2O_3$), a silver oxide ($Ag_2$), an iron oxide, a magnesium oxide (MgO), a manganese oxide ($Mn_3O_4$), an yttrium oxide ($Y_2O_3$), a cerium oxide, a samarium oxide, a beryllium oxide (BeO), a vanadium oxide ($V_2O_5$), a chromium oxide ($Cr_2O_3$), and a barium oxide (Bao).

Examples of the complex oxide include a lithium aluminate ($LiAlO_2$), an yttrium vanadate, a calcium phosphate, a calcium zirconate ($CaZro_3$), a titanium lead zirconate, a titanium iron oxide ($FeTiO_3$) and a titanium cobalt oxide ($CoTiO_3$). Examples of the multiple oxide include a barium stannate ($BaSnO_3$), a barium (meta) titanate ($BaTiO_3$), a lead titanate ($PbTiO_3$), and a solid solution in which a zirconium oxide and a calcium oxide are dissolved as solids in a barium titanate.

The hydroxide is exemplified by $Zr(OH)_4$, the carbonic acid compound by $CaCO_3$, the halide by $MgF_2$, the sulfide by ZnS, the nitride by TiN, the carbide by SiC, and the hydride by $TiH_2$.

The present invention is basically configured as above. While the fine particle manufacturing apparatus and the fine particle manufacturing method according to the invention are described above in detail, the invention is by no means limited to the foregoing embodiments and it should be understood that various improvements and modifications are possible without departing from the scope and spirit of the invention.

REFERENCE SIGNS LIST

10, 10*a* fine particle manufacturing apparatus (manufacturing apparatus)
12 feedstock supply section
13 supply tube
14 plasma torch
14*a* quartz tube
14*b* high frequency oscillation coil
14*c* supply port
14*d* plasma gas supply port
14*e* quartz tube
14*f* cooling water
15 intermittent supply section
16 chamber
16*a* upstream chamber
16*b* downstream chamber
18 collection section
18*a* filter
18*b* vacuum pump
20 plasma gas supply section
21 plasma generation section
22 gas supply section
24 control section
26 high frequency modulated induction thermal plasma generation section
28*a* high frequency inverter power source
28*b* impedance matching circuit
28*c* pulse signal generator
28*d* FET gate signal circuit
30*a* trigger circuit
30*b* electromagnetic coil
30*c* valve
45 mixture
50 model
50*a* end
50*b* end
50*c* supply section
100 thermal plasma flame 102 square wave
104 pulse control signal
106 timing signal
108 waveform
C central axis

The invention claimed is:

1. A fine particle manufacturing apparatus comprising:
a feedstock supply section configured to supply feedstock for fine particle manufacturing into a thermal plasma flame;
a plasma torch configured to allow the thermal plasma flame to be generated therein and, by use of the thermal plasma flame, evaporate the feedstock supplied by the feedstock supply section to convert the feedstock into a mixture in a gas phase state;
a plasma generation section configured to generate the thermal plasma flame inside the plasma torch; and
a gas supply section configured to supply quenching gas to the thermal plasma flame,
wherein the gas supply section supplies the quenching gas while time-modulating an amount of supply of the quenching gas.

2. The fine particle manufacturing apparatus according to claim 1, wherein the feedstock supply section supplies the feedstock into the thermal plasma flame while time-modulating an amount of supply of the feedstock into the thermal plasma flame.

3. The fine particle manufacturing apparatus according to claim 1, wherein the plasma generation section supplies a high frequency current that is amplitude-modulated to a coil for generating the thermal plasma flame and generates, as the thermal plasma flame, a modulated induction thermal plasma flame whose temperature state is time-modulated, and
wherein the high frequency current has an ON time during which a current amplitude has a high value and an OFF time during which the current amplitude has a low value.

4. The fine particle manufacturing apparatus according to claim 3, wherein, during the ON time of the high frequency current, the feedstock supply section increases the amount of supply of the feedstock.

5. The fine particle manufacturing apparatus according to claim 1, wherein the feedstock supply section supplies the feedstock into the thermal plasma flame with the feedstock being dispersed in a particulate form.

6. The fine particle manufacturing apparatus according to claim 1, wherein the feedstock supply section disperses the feedstock in liquid to obtain a slurry and converts the slurry into droplets to supply the droplets into the thermal plasma flame.

7. A fine particle manufacturing method comprising:
a first step of supplying feedstock for fine particle manufacturing to a thermal plasma flame; and
a second step of evaporating the feedstock by use of the thermal plasma flame to convert the feedstock into a mixture in a gas phase state and supplying quenching gas to the thermal plasma flame,
wherein in the second step, the quenching gas is supplied while an amount of supply of the quenching gas is time-modulated.

8. The fine particle manufacturing method according to claim 7, wherein in the first step, the feedstock is supplied into the thermal plasma flame while an amount of supply of the feedstock into the thermal plasma flame is time-modulated.

9. The fine particle manufacturing method according to claim 7, wherein in the first step, the feedstock is supplied into the thermal plasma flame with the feedstock being dispersed in a particulate form.

10. The fine particle manufacturing method according to claim 7, wherein in the first step, the feedstock is dispersed in liquid to obtain a slurry, the slurry is converted into droplets, and the droplets are supplied into the thermal plasma flame.

11. The fine particle manufacturing apparatus according to claim 3, wherein during the OFF time of the high frequency current, the gas supply section increases the amount of supply of the quenching gas.

12. The fine particle manufacturing method according to claim 7, wherein a high frequency current that is amplitude-modulated is supplied to a coil for generating the thermal plasma flame, and a modulated induction thermal plasma flame is generated as the thermal plasma flame, and
wherein the high frequency current has an ON time during which a current amplitude has a high value and an OFF time during which the current amplitude has a low value.

13. The fine particle manufacturing method according to claim 12, wherein in the second step, during the OFF time of the high frequency current, the amount of supply of the quenching gas is increased.

14. The fine particle manufacturing method according to claim 12, wherein in the first step, during the ON time of the high frequency current, the amount of supply of the feedstock is increased.

15. The fine particle manufacturing apparatus according to claim 2, wherein the plasma generation section supplies a high frequency current that is amplitude-modulated to a coil for generating the thermal plasma flame and generates, as the thermal plasma flame, a modulated induction thermal plasma flame whose temperature state is time-modulated, and
wherein the high frequency current has an ON time during which a current amplitude has a high value and an OFF time during which the current amplitude has a low value.

16. The fine particle manufacturing apparatus according to claim 15, wherein during the OFF time of the high frequency current, the gas supply section increases the amount of supply of the quenching gas.

17. The fine particle manufacturing apparatus according to claim 11, wherein during the ON time of the high frequency current, the feedstock supply section increases the amount of supply of the feedstock.

18. The fine particle manufacturing method according to claim 8, wherein a high frequency current that is amplitude-modulated is supplied to a coil for generating the thermal plasma flame, and a modulated induction thermal plasma flame is generated as the thermal plasma flame, and
wherein the high frequency current has an ON time during which a current amplitude has a high value and an OFF time during which the current amplitude has a low value.

19. The fine particle manufacturing method according to claim 18, wherein in the second step, during the OFF time of the high frequency current, the amount of supply of the quenching gas is increased.

20. The fine particle manufacturing method according to claim 13, wherein in the first step, during the ON time of the high frequency current, the amount of supply of the feedstock is increased.

* * * * *